United States Patent [19]

Lee et al.

[11] Patent Number: 5,409,734
[45] Date of Patent: Apr. 25, 1995

[54] MAKING LIQUID SUSPENSION TYPE LIGHT VALVE FILM

[75] Inventors: Jeong Hoon Lee, Seoul; Byung Seok Yu; Eung Su Kim, both of Inchon, all of Rep. of Korea

[73] Assignee: Hankuk Glass Industries, Inc., Seoul, Rep. of Korea

[21] Appl. No.: 1,782

[22] Filed: Jan. 8, 1993

Related U.S. Application Data

[63] Continuation-in-part of Ser. No. 950,904, Sep. 24, 1992, abandoned.

[30] Foreign Application Priority Data

Jan. 10, 1992 [KR] Rep. of Korea ............ 92-259
Jul. 1, 1992 [KR] Rep. of Korea ............ 92-11659

[51] Int. Cl.$^6$ ............ B05D 5/06; F21V 9/14; G02F 1/01
[52] U.S. Cl. ............ 427/163.1; 252/583; 252/585; 359/296; 427/164
[58] Field of Search ............ 252/583, 585; 427/163, 427/164; 428/321.5; 359/296

[56] References Cited

U.S. PATENT DOCUMENTS

| | | | |
|---|---|---|---|
| 1,951,664 | 3/1934 | Land | 252/6 |
| 1,955,923 | 4/1934 | Land | 88/61 |
| 2,041,138 | 5/1936 | Land | 18/57 |
| 2,290,581 | 7/1942 | Donal, Jr. | 178/17.5 |
| 2,306,108 | 12/1942 | Land et al. | 18/56 |
| 2,375,963 | 5/1945 | Thomas | 18/48 |
| 3,625,869 | 12/1971 | Marks | 252/500 |
| 3,756,700 | 9/1973 | Saxe | 350/267 |
| 3,774,988 | 11/1973 | Rogers | 359/275 |
| 3,841,732 | 10/1974 | Saxe | 350/362 |
| 3,912,365 | 10/1975 | Lowell | 350/160 R |
| 4,025,163 | 5/1977 | Saxe et al. | 350/160 R |
| 4,078,856 | 3/1978 | Thompson et al. | 350/362 |
| 4,113,362 | 9/1978 | Saxe et al. | 350/362 |
| 4,164,365 | 8/1979 | Saxe | 350/362 |
| 4,229,498 | 10/1980 | Suzuki et al. | 359/63 X |
| 4,247,175 | 1/1981 | Saxe | 350/362 |
| 4,270,841 | 6/1981 | Saxe | 350/374 |
| 4,273,422 | 6/1981 | Saxe | 350/362 |
| 4,320,940 | 3/1982 | Mueller et al. | 252/582 X |
| 4,407,565 | 10/1983 | Saxe | 350/374 |
| 4,422,963 | 12/1983 | Thompson et al. | 252/583 |
| 4,435,047 | 3/1984 | Fergason | 350/334 |
| 4,442,019 | 4/1984 | Marks | 252/309 |
| 4,579,423 | 4/1986 | Fergason | 350/334 |
| 4,616,903 | 10/1986 | Fergason | 350/334 |
| 4,685,771 | 8/1987 | West et al. | 350/347 V |
| 4,772,103 | 9/1988 | Saxe | 350/362 |
| 4,884,873 | 12/1989 | Fergason | 350/334 |
| 4,888,126 | 12/1989 | Mullen et al. | 359/52 X |
| 4,919,521 | 4/1990 | Tada et al. | 350/362 |
| 4,963,901 | 10/1990 | Wilkinson et al. | 346/76 L |
| 5,089,904 | 2/1992 | Fergason | 359/52 |
| 5,113,270 | 5/1992 | Fergason | 359/37 |
| 5,279,773 | 1/1994 | Saxe | 252/585 |

FOREIGN PATENT DOCUMENTS

| | | |
|---|---|---|
| 0156615 | 10/1985 | European Pat. Off. |
| 0551138 | 7/1993 | European Pat. Off. ............ 359/296 |
| 433455 | 9/1935 | United Kingdom . |
| 9309460 | 5/1993 | WIPO . |

OTHER PUBLICATIONS

A. Noshay et al., *Block Copolymers—Overview and Critical Survey*, Academic Press, 1977.
W. J. Burlant et al., *Block and Graft Polymers*, Reinhold Publishing Corp., 1960.
J. K. Sears et al., *The Technology of Plasticizers*, John Wiley & Sons, 1982.
J. Brandrup et al., *Polymer Handbook*, 2nd ed., John Wiley & Sons, 1975.
J. W. Doane et al., "Polymer Dispersed Liquid Crystals for Display Application", *Mol. Cryst. Liq. Cryst.*, vol. 165, 1988, pp. 511–532.
*Solvent Pocketbook*, Ohm Co., Ltd., Japan, Jan. 30, 1987, pp. 422–425.

*Primary Examiner*—Richard D. Lovering
*Attorney, Agent, or Firm*—Brumbaugh, Graves, Donohue & Raymond

[57] ABSTRACT

A film for a light valve is made by phase separation of a mixture comprising a homogeneous polymeric solution and a liquid suspension of light-polarizing particles. Uniform liquid-suspension droplets in a polymeric matrix are formed by phase separation processing, e.g., by polymerization or solvent evaporation. Such simple, one-step processing results in cost reduction in display and window applications. Sealing problems of conventional light valves are alleviated.

36 Claims, 3 Drawing Sheets

MAKING LIQUID SUSPENSION TYPE LIGHT VALVE FILM

This is a continuation-in-part application of application Ser. No. 07/950,904, filed Sep. 24, 1992, now abandoned.

BACKGROUND OF THE INVENTION

The present invention relates to films comprising a liquid polarizing suspension dispersed in a polymeric resin. More particularly, it relates to films comprising microdroplets and/or interconnected structure of a liquid polarizing suspension. It also relates to methods for fabricating such films.

A light valve was invented and patented by Edwin H. Land (U.S. Pat. Nos. 1,951,664 and 1,955,923). Land's light valve is a cell comprising two substrates, with at least one of them being transparent. The substrates bear electrodes, usually in the form of a transparent conductive oxide (TCO) coating. The substrates, which form the walls of the cell, are spaced a small distance apart. The cell contains a suspension of small particles in a liquid suspending medium. In the absence of an applied electric field, the particles in the liquid suspension exhibit random Brownian motion, and a beam of light passing into the cell is reflected, transmitted or absorbed depending upon the nature and concentration of the particles and the energy content of the light. When an electric field is applied through the suspension, the particles become aligned parallel to the electric field, and most of the light can pass through the cell. Difficulties with these early light valves included particle settling, particle clustering, color change by heat, reduction of off-state optical density, and degradation by ultraviolet (UV) light, so that suspended-particle light valves have not heretofore been developed into practical commercial devices.

Some of these difficulties, such as particle settling, particle clustering, color change by heat, and reduction of off-state optical density have been solved by R. L. Saxe (U.S. Pat. Nos. 3,756,700; 4,247,175; 4,273,422; 4,407,565; and 4,422,963), F. C. Lowell (U.S. Pat. No. 3,912,365), and R. I. Thompson (U.S. Pat. No. 4,078,856). Here, light valves contained a liquid suspension of solid particles of colloidal size, a polymeric system for helping to disperse the particles in the liquid, and a polymeric stabilizer. Mentioned difficulties were overcome by matching of the densities of suspended particles and suspending medium, and by adding the polymeric stabilizer.

However, with particles in liquid suspension, and when the vertical dimension of a cell is large, hydrostatic pressure of the liquid suspension causes a pressure difference between upper and lower portions of a cell. Resulting net outward forces on the substrates cause bowing and distortion of the substrates into non-planar surfaces. Bowing or distortion in turn leads to non-uniform suspension thickness and non-uniform optical density across the cell. Also, when such light valves are used as windows for buildings, a corresponding inward-bowing effect can result due to wind or difference in pressure between inside and outside a building. Other disadvantages are degradation due to UV-radiation, difficulties in filling or pouring the liquid suspension into a cell, agglomeration of particles in suspension, leaking of the suspension due to failure of a seal, and unequal response time and optical density due to a voltage drop from an edge to the middle of a TCO-substrate.

J. Fergason (U.S. Pat. Nos. 4,435,047; 4,579,423; and 4,616,903) and J. L. West (U.S. Pat. No. 4,685,771) invented films comprising microdroplets of a liquid-crystal material dispersed in a polymeric matrix. In these films, micron-size liquid-crystal droplets are dispersed in and surrounded by polymeric material. In the absence of an applied field, light passing through the film is strongly forward-scattered, giving the film a milky translucent appearance. When an electric field is applied, the liquid-crystal molecules become aligned and the film becomes transparent. Formation of uniform liquid-crystal droplets in a polymeric matrix can be achieved by one of a number of phase separation processes, involving, e.g., polymerization, thermal processing, solvent evaporation, or emulsifying.

The light valves invented by J. Fergason and J. L. West are milky translucent in the absence of an applied voltage. Their light scattering properties detract from their aesthetic appeal and thus limit their applicability to displays and windows. Furthermore, the liquid crystal partially interacts with the polymeric matrix, as a plasticizer and a mixture of several liquid-crystal materials is used. As a result, in the presence of an applied field, the transparent state remains milky because of a difference between the refractive indices of the liquid crystal and the polymeric matrix. Optical use as a light valve is limited to switching functions, between transparent and opaque states. Such a light valve can be used for curtainless windows and the like, but is not applicable for so-called smart windows, where continuous control of transmittance of solar radiation is required. Moreover, since liquid-crystal materials are affected by UV-radiation, a UV-blocking filter or UV-absorbing additive is necessary. Specifically with respect to nematic liquid-crystal materials, their applicability is limited because of temperature sensitivity.

SUMMARY OF THE INVENTION

It is an object of the present invention to provide films comprising microdroplets of a liquid suspension dispersed in a solid or semisolid polymeric film.

It is a further object of the present invention to provide films which comprise an interconnected structure of a liquid suspension dispersed in a polymeric film.

It is another object of the present invention to provide for convenience of fabrication and to alleviate sealing difficulties encountered with conventional light valves.

It is another object of the present invention to provide films whose radiation transmittance can be controlled with an electric field and which have high resistance to UV-light and to heat.

It is another object of the present invention to provide films which can be used for curtainless windows and to smart windows with continuous control of transmittance of solar radiation.

A preferred film comprises light-polarizing particles sized from 0.1 to 1 μm, a polymeric stabilizer or dispersing agent for keeping the particles in suspension, a suspending medium, e.g., a plasticizer, having good dispersion characteristics, being incompatible or partially compatible with a polymeric matrix, and having a refractive index which is matched to the refractive index of the polymeric matrix.

DETAILED DESCRIPTION OF PREFERRED EMBODIMENTS

Figure 1:
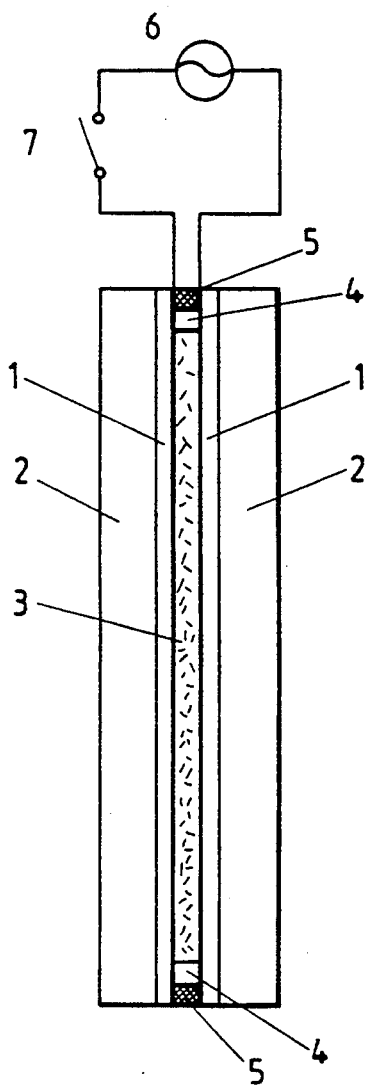
FIG. 1 is a cross-sectional view of a prior-art light valve including a liquid polarizing suspension.

Prior-art difficulties are alleviated by forming a film comprising a liquid polarizing suspension dispersed in a polymeric matrix. In the absence of an AC-voltage applied to the film, particles in microdroplets and/or an interconnected structure of the liquid polarizing suspension exhibit random Brownian motion, and the film is dark blue due to the electro-dichroic effect of polarizing particles. When an AC-voltage is applied across the film, the particles in the liquid polarizing suspension become aligned parallel to the electric field, and, when the refractive indices of the polymeric matrix and the suspension are matched, the film becomes transparent. Preferred films are less prone to difficulties in adding the liquid suspension to a cell, agglomeration of particles in suspension, leaking of the suspension due to failure of a seal, and unequal response time and optical density due to a voltage drop from an edge to the middle of a TCO-substrate. A preferred suspension contains a fluoro-copolymer suspending medium, a polymeric stabilizer such as an acrylic copolymer, a UV-absorbing agent, and a dispersing agent. When a film is prepared from such a suspension by phase separation by polymerization, solvent evaporation, or thermal treatment, care is required to match the refractive indices of the liquid suspension and the polymeric matrix. Also, the particles should remain in the microdroplets segregated from the polymeric matrix, for proper alignment in an applied electric field. (When nitrocellulose was previously used in making the polarizing particles for good dispersion and for particle uniformity, light-polarizing particles could remain in the polymeric matrix because the polymer is almost compatible with nitrocellulose.)

Preferred films of the present invention comprise a light-polarizing liquid suspension and a polymeric matrix about one to four times the amount of liquid suspension. The liquid suspension comprises 1 to 20 wt. % of light-polarizing particles, 60 to 98 wt. % of suspending medium, and 1 to 20 wt. % of polymeric stabilizer or dispersing agent for keeping the particles suspended in a suspending medium. Light-polarizing particles are formed as polyhalides by reaction of a precursor (pyrazine-2,3-dicarboxylic acid, pyrazine-2,5-dicarboxylic acid, pyridine-2,5-dicarboxylic acid, hydroxyquinoline, dihydrocinchonidine-sulfate, or 2-hydroxypyridine) with hydrogen iodide and iodine in the presence of a protective material such as a copolymer and nitrocellulose.

Suitable light-polarizing particles are described in U.S. Pat. Nos. 2,041,138; 2,306,108; 2,375,963; and 4,270,841 and in U.K. Patent No. 433,455. Described polyhalide particles are herapathite crystals formed by reaction of quinine bisulfate, iodine, and hydrogen iodide. Salts of other members of the quinine alkaloid family also form light-polarizing polyiodides by reaction, e.g., of cinchonidine bisulfate with iodine and hydrogen iodide. Furthermore, polyhalides such as polyiodides, polychlorides and polybromides can be formed by reaction of pyrazine or pyridine carboxylic acid, hydrogen halide acid and/or alkali metal or alkaline earth metal halide with elemental iodine, chlorine, or bromine. A polyhalide is a complex of halide atoms and an inorganic or organic matrix. Methods for the manufacture of light-polarizing particles are described in detail in U.S. Pat. No. 4,422,963 which discloses the use of polymeric materials such as nitrocellulose for uniform particle size and improved dispersion in a suspending medium. Since nitrocellulose is compatible with the polymeric matrix material, particles treated with nitrocellulose are not segregated to the microdroplets but may remain in the polymeric matrix. In accordance with an aspect of the invention, this drawback is overcome by use of a polymeric dispersant, e.g., poly(acrylic acid) or poly(2-hydroxyethyl methacrylate), which is incompatible or partially compatible with the polymeric matrix material. Particles treated with nitrocellulose can be segregated to the microdroplets by adding A-B type block copolymer. This copolymer has to be soluble in the liquid suspending medium, incompatible or partially compatible with the polymeric matrix material, and inert with respect to the suspended particles and the suspending medium. The conductivity and viscosity of the liquid suspension should remain limited. In the present invention, preferred size of the light-polarizing particles is less than 1 $\mu$m and preferably in a range from 0.1 to 0.3 $\mu$m, and the particles should be shaped like needles, laths, rods, or plates. When particle size is greater than 1 $\mu$m, a film may not be transparent even in the presence of a field, due to the electro-dichroic effect of particles in the polymeric matrix.

The polymeric stabilizer used in the present invention is A-B type block copolymer. This copolymer has to be soluble in the liquid suspending medium, and to be incompatible or at most partially compatible with the polymeric matrix. The copolymer must be inert with respect to the suspended particles and the suspending medium, and its inclusion should not result in an overly conductive or viscous suspension. The A-B type copolymers used in the present invention comprise a solvating or solubilizing component and an anchoring component, wherein the solvating or B-component of the block copolymer is an organic group having sufficient branching to impart solubility, and wherein the second or A-segment of the block copolymer anchors to the surface of the light-polarizing particles or to another polymer on the surface of the particles. These requirements are satisfied by an A-B type block copolymer such as poly(neopentyl methacrylate-block-hydroxyethyl methacrylate), poly(neopentyl methacrylate-block-styrene), or poly(acrylonitrile-block-styrene). Block copolymers are described in "Block Copolymers—Overview and Critical Survey", A Noshay et al, Academic Press, New York, 1977, pp. 83–163 and in "Block and Graft Polymers", W. J. Burlant et al., Reinhold Publishing Corp., New York, 1960. In the present invention, the amount of the A-B type block copolymer in the liquid polarizing suspension is below 10 wt. % and preferably in the range from 2 to 5 wt. %. Higher A-B block copolymer contents than specified here result in inordinately slow response and, when an applied field is weak, in inadequate transparency of the film. Also suitable as dispersant materials are oil-soluble phosphate salts of alkyl amines.

Suitable liquid suspending media are described in U.S. Pat. Nos. 1,951,664; 2,290,581; 3,625,869; 4,247,175; and 4,442,019. Described there are a number of liquid suspension media, e.g., esters, oils, aromatic alcohols, and aromatic esters for suspending particles in light valves. In accordance with an aspect of the invention, the liquid suspending medium has to be incompatible or at most partially compatible with the polymeric matrix, and to be inert with respect to the suspended particles and the polymeric stabilizer. Also, the difference of refractive index between suspending medium and a polymeric matrix must not exceed 0.02. The suspending medium in the present invention is a plasticizer such as a phthalate (dioctyl phthalate, dibutyl phthalate, diisooctyl phthalate, butyloctyl phthalate), an isophthalate (dioctyl isophthalate), an oleate (butyl oleate, or n-propyl oleate, for example), an adipate (dioctyl adipate, etc.), or a benzoate (diethyl glycol dibenzoate, etc.). Plasticizers are described in "The Technology of Plasticizers", J. K. Sears et al, John Wiley & Sons, New York, 1982, pp. 966–1077. Table 1 shows properties and polymeric compatibilities of plasticizers used in the present invention.

Uniform liquid-suspension droplets in a polymeric matrix can be formed by various phase-separation processes, e.g., by polymerization, by thermal processing, by solvent evaporation, by an emulsifying method. Each of these involves the formation of a homogeneous solution of a polymer or pre-polymer with a liquid suspension, followed by phase separation, droplet formation, and, finally, polymer gelation or solidification. Phase-separation processing can be applied to a broad range of polymers, including thermo-plastic and thermosetting resins. These methods are simple, and their use can reduce fabrication costs in display or window applications. They are applicable not only to liquid-suspension, polymer-matrix systems, but also to liquid-crystal, polymer-matrix systems for making a light valve. Commercialization of the latter has met with practical difficulties, however.

In accordance with an aspect of the present invention, films for a light valve comprise micron-size droplets and/or an interconnected structure of a liquid suspension, dispersed in a polymeric matrix. Preferred manufacture comprises a phase-separation process, e.g., polymerization, thermal processing, or solvent evaporation. The droplets are made of a liquid polarizing suspension, not of liquid crystal. In the absence of an applied voltage, the light valve appears dark blue, not because of light scattering, but because of light absorption by the particles.

A preferred first fabrication method of films of the invention involves phase separation by solvent evaporation and includes the following steps:

1. The polymer is dissolved in a common solvent.
2. The resulting solution is mixed with the liquid suspension to form a homogeneous solution.
3. A PET- or glass TCO-substrate is coated with the resulting solution by doctor-blading or roll coating. The thickness of the wet coating is 10 to 300 μm,
4. The solvent is evaporated in a clean environment at room temperature or at 50° to 90° C.
5. A second conductive substrate is adhered to the resulting film, under pressure and heat.

The refractive index of the polymeric matrix used in the present invention is about from 1.46 to 1.50. The polymeric matrix is incompatible or partially compatible with the suspending medium, and is a polymeric resin, e.g., poly(vinylbutyral), poly(vinylacetate), poly(methylmethacrylate), or cellulose acetate. Table 2 shows properties and solvents of the polymeric matrix.

Solvents of the polymeric matrix used in the present invention are esters (isoamyl acetate, benzyl acetate, ethyl acetate, and methyl acetate) and aromatic hydrocarbons (xylene and toluene). These solvents are described in "Polymer Handbook", 3rd ed J. Brandrup et al., John Wiley & Sons, VII/379-VII/403, 1989.

For phase separation by solvent evaporation, preferred thermoplastic resins are soluble in a solvent, or mixture of solvents, with which the liquid polarizing suspension is miscible. Solvent evaporation is useful for resins whose transition temperature is so high that the liquid polarizing suspension is degraded at temperatures higher than the transition temperature. In the present invention, the liquid polarizing suspension and a resin, e.g., poly(vinyl butyral), poly(vinyl acetate), poly(methyl methacrylate), or cellulose acetate, are dissolved in a common solvent forming a homogeneous solution. The liquid polarizing suspension comprises a liquid suspending medium which is incompatible or partially compatible with the polymeric matrix, and whose refractive index closely matches the refractive index of the polymeric matrix. The solution is coated onto a substrate of a transparent conductive glass or PET-film, by doctor-blading or roller coating. The solvent is removed by evaporation in a clean environment at room temperature or at 50° to 90° C., resulting in phase separation and polymer solidification. The resulting film has droplets and/or interconnected structure of the suspension dispersed in a polymeric matrix. Droplet size, shape, and interconnected structure depend on the rate of solvent removal, the rate of diffusion, the relative concentration of the suspension in the solution, the types of suspending medium and polymer used, the degree of compatibility of the polymer and the suspending medium, and on physical parameters such as viscosity.

A preferred second fabrication method for films of the invention involves phase separation by polymerization. This method is particularly useful if a pre-polymer material is miscible with the liquid polarizing suspension. A homogeneous solution is prepared by mixing the pre-polymer with the liquid polarizing suspension. Polymerization is effected by a condensation reaction, e.g., with a thermosetting resin such as epoxy, silicone, or urethane, for example; by free-radical polymerization, as with vinyl or acrylic monomers such as methyl methacrylate or vinyl acetate, catalyzed with a free-radical initiator such as benzoylperoxide; or by photo-initiated polymerization. The solubility of the liquid polarizing suspension decreases as polymer chains grow longer, until the liquid-polarizing-suspension phase separates, forming droplets. The size of droplets and/or interconnected structure of the suspension dispersed in a polymeric matrix, and the film morphology are established in the time interval between droplet nucleation and gelation of the polymer. Droplet size depends on the rate of polymerization, the rate of diffusion, the solubility of the liquid polarizing suspension and the polymer, the types of suspending medium and polymer used, and by physical parameters such as viscosity.

A preferred third fabrication method for films in accordance with the present invention involves phase separation by thermal processing. This method is particularly useful for thermoplastic resins which melt below their decomposition temperature. A binary mixture of a polymer and a liquid polarizing suspension forms a homogeneous solution at elevated temperature. Cooling the homogeneous solution into the miscibility gap causes phase separation of the liquid polarizing suspension. Droplet size of the liquid polarizing suspension is governed by the rate of cooling and depends on a number of material parameters, e.g., viscosity and chemical potential.

The present invention is applicable for films capable of controlling the transmittance of solar radiation by an electric field. The operating principle of such films is based on electric-field alignment of light-polarizing particles in droplets dispersed in the polymeric matrix. An AC-voltage is preferred for activating the film. In the present invention, higher transmission and better contrast are achieved on account of matching of the refractive indices of a suspending medium and a polymeric matrix. Incident light which encounters an effective refractive index difference between the polymeric matrix and the suspending medium is scattered; light which encounters no such difference is transmitted. Typical operating voltage and frequency ranges for films of the invention are from 30 to 300 volts RMS and 30 to 1000 hertz, respectively. Typically, the decay time is about several tens of milliseconds, and the rise time is about one-fifth to one-half of the decay time. Light valves of the invention have excellent stability in a cycle test of $2 \times 10^5$ cycles, and they can withstand a temperature of 85° C. for at least 1000 hours without significant degradation of properties.

Many types of conductive coatings and overcoatings can be incorporated into light valves including films of the present invention. To isolate the conductive coating, an overcoating 200 to 1000 Å thick can be deposited on one or both of the conductive coatings.

In the absence of an AC-voltage applied to the film, particles in microdroplets and/or an interconnected structure of the liquid polarizing suspension exhibit random Brownian motion, and the film is dark blue due to the electro-dichroic effect of polarizing particles. When an AC-voltage is applied across the film, the particles in the liquid polarizing suspension become aligned parallel to the electric field, and, when the refractive indices of a polymeric matrix and the suspension are matched, the film becomes transparent. Such films are less prone to difficulties in adding the liquid suspension to a cell, agglomeration of particles in suspension, leaking of the suspension due to failure of a seal, and unequal response time and optical density due to a voltage drop from an edge to the middle of a TCO-substrate. Light valves comprising a liquid crystal are milky translucent in the absence of an applied voltage. Their light scattering properties detract from their aesthetic appeal and thus limit their applicability to displays and windows. Furthermore, the liquid crystal partially interacts with the polymeric matrix, as a plasticizer and a mixture of several liquid-crystal materials is used. As a result, in the presence of an applied field, the transparent state remains milky because of a difference between the refractive indices of the liquid crystal and the polymeric matrix. Moreover, since liquid-crystal materials are affected by UV-radiation, a UV-blocking filter or UV-absorbing additive is necessary. Specifically with respect to nematic liquid-crystal materials, their applicability is limited because of temperature sensitivity. By the present invention, on the other hand, these difficulties are alleviated.

The present invention provides a film of liquid suspension dispersed in a polymeric matrix which is conveniently fabricated and which does not suffer from sealing difficulties as in a conventional light valve. Formation of uniform liquid suspension droplets in a polymeric matrix is achieved by phase-separation processing, e.g., by polymerization, thermal processing, or solvent evaporation. Advantageously, use of these simple, inexpensive, one-step methods results in cost reduction in the fabrication of displays and windows.

Films of the present invention can be used for a large variety of applications, e.g., in automobile display devices, automobile windshields, automobile rear-view mirrors, windows for buildings, sunglasses, optical shutters, and flat-panel display devices.

With reference to FIG. 1, a prior-art light valve includes two glass substrates 2, each with a transparent conductive coating 1 on its inner surface. The glass substrates 2 are separated by a spacer 4, and a sealing material 5 is provided for sealing the edges of the glass substrates to form a chamber for the light-polarizing suspension 3. The conductive coating 1 is connected to an AC-power supply 6 via a switch.

Figure 2:
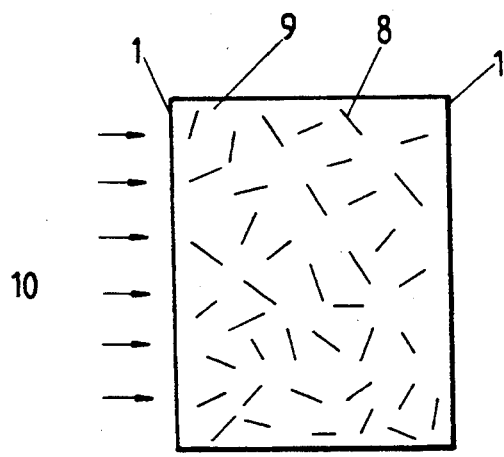
FIGS. 2 and 3 are schematics of the closed (off, unactivated, dark) and open (on, activated, transparent) states of a prior-art light valve including a liquid polarizing suspension.

FIG. 2 shows the closed or opaque state of the prior-art light valve. Tiny rod-shaped particles 8 are in random orientation in the suspending medium 9. A beam of light 10 impinging on the light valve is substantially cut off by absorption, reflection, and/or scattering.

Figure 3:
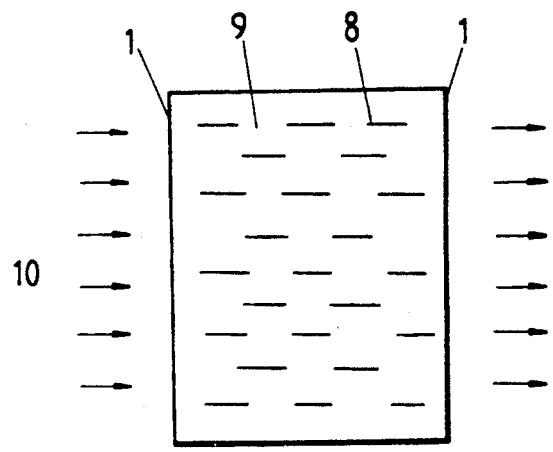

FIG. 3 shows the open or transparent state of the prior-art light valve. An electric field between the conductive coatings aligns the particles 8, and the light beam 10 passes through the cell.

Figure 4:
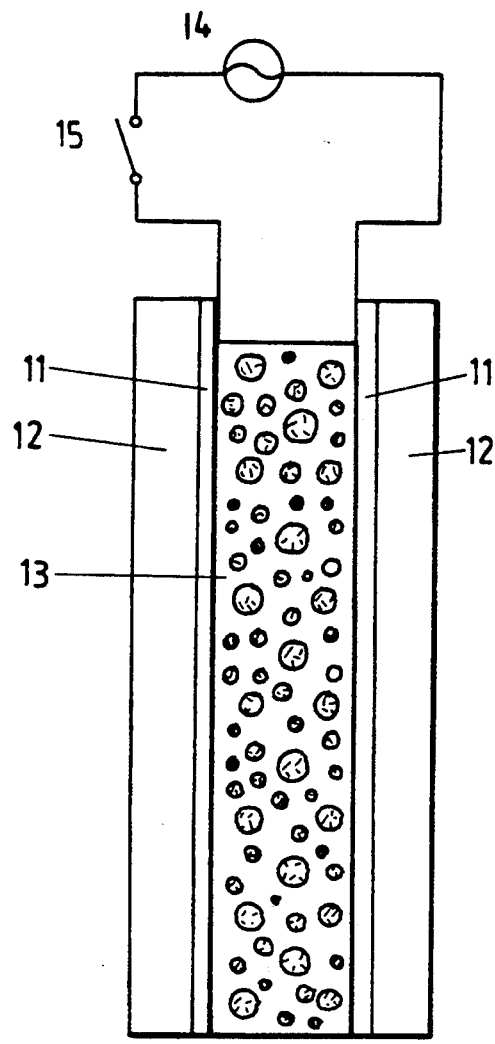
FIG. 4 is a fragmentary, cross-sectional schematic of a light valve in accordance with a preferred embodiment of the present invention, including a transparent plastic film containing microdroplets of a liquid polarizing suspension.
Figure 5:
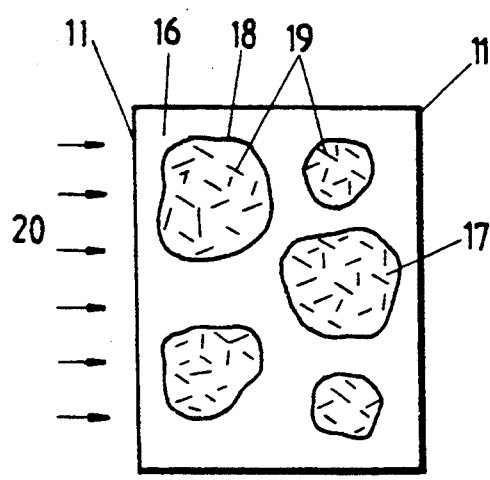
FIGS. 5 and 6 are fragmentary schematics of the closed (off, unactivated, dark) and open (on, activated, transparent) states of a film in accordance with the invention, comprising microdroplets of a liquid suspension in a polymeric matrix.
Figure 6:
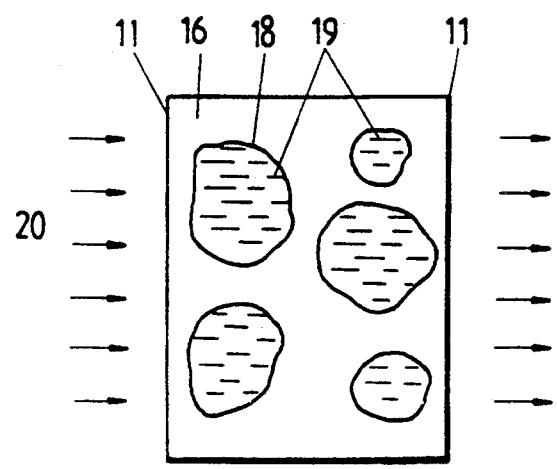

FIG. 4, 5 and 6 relate to a light valve of the present invention, including a film 13 containing micro-droplets 18 of the liquid polarizing suspension dispersed in the polymeric matrix 16. This light valve contains a film sandwiched between two glass substrates 12 with transparent conductive coatings 11 on their inner faces.

FIG. 5 schematically shows the closed or opaque state of a light valve of the present invention, comprising microdroplets 18 of the liquid suspension dispersed in a polymeric matrix 16. Tiny rod-shaped particles 19 are oriented at random in the suspending medium 17. A beam of light 20 impinging on the light valve is substantially cut off by absorption, reflection, and/or scattering.

FIG. 6 shows the open or transparent state of the light valve of the present invention, comprising microdroplets 18 of the liquid suspension dispersed in a polymeric matrix 16. Here, in the presence of an applied electric field, the particles 19 are aligned and the light beam 20 passes through the cell.

Figure 7:
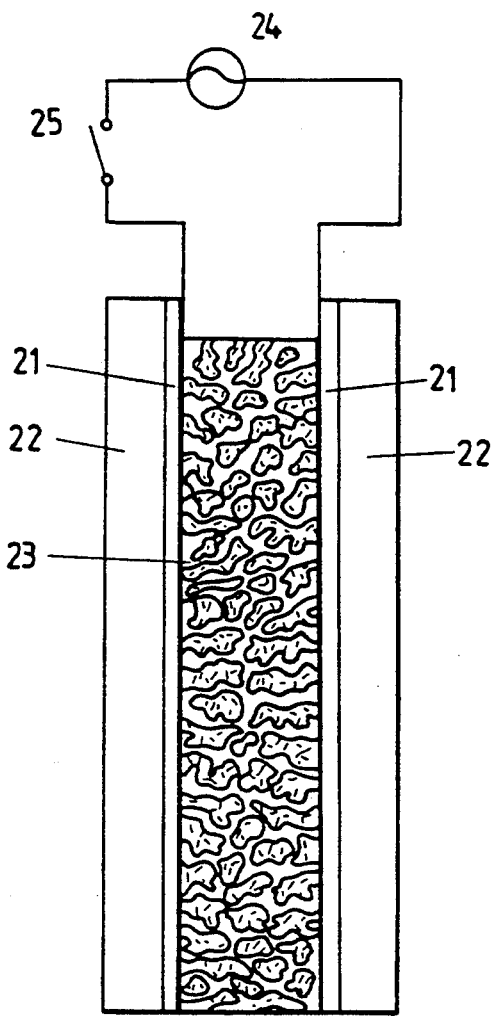
FIG. 7 is a fragmentary, cross-sectional schematic of a light valve in accordance with a preferred embodiment of the present invention, including a transparent film containing an interconnected structure of droplets of a liquid polarizing suspension.
Figure 8:
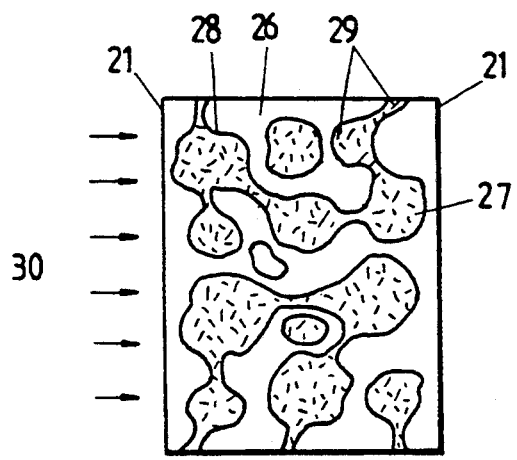
FIGS. 8 and 9 are fragmentary, cross-sectional schematics of the closed (off, unactivated, dark) and open (on, activated, transparent) states of a film in accordance with the invention, comprising an interconnected structure of droplets of liquid suspension in a polymeric matrix.
Figure 9:
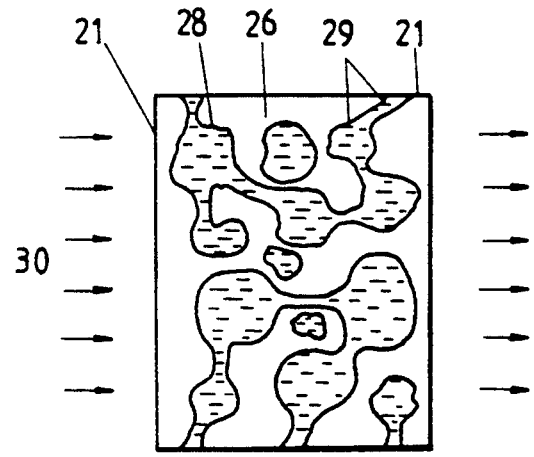

FIG. 7, 8 and 9 relate to another light valve of the present invention, comprising a film 23 with interconnected structure 28 of droplets of the liquid suspension dispersed in a polymeric matrix. This light valve includes a film sandwiched between two glass substrates 22 having transparent conductive coatings 21 on their inner faces.

FIG. 8 schematically shows the closed, opaque state of the light valve of FIG. 7, comprising an interconnected structure 28 of droplets of the liquid suspension dispersed in a polymeric matrix 26. Tiny rod-shaped particles 29 are oriented at random in the suspending medium 28. A beam of light 30 impinging on the light valve is substantially cut off due to absorption, reflection, and scattering.

FIG. 9 shows the open, transparent state of the light valve of FIG. 7, comprising an interconnected structure 28 of droplets of the liquid suspension dispersed in a polymeric matrix 26. Here, in the presence of an applied electric field, the particles 29 are aligned, and the beam passes through the cell.

EXAMPLE 1

An amount of 10 grams of a polymeric resin was dissolved in 40 grams of a solvent, and 5 grams of a liquid polarizing suspension was added which consisted of 20 wt. % particles, 15 wt. % polymeric dispersant, and 65 wt. % suspending medium. The combination was mixed by mechanical stirring for 30 minutes and by ultrasonic agitation for 2 hours. The mixture was degassed, to form a stable emulsion.

The emulsion was cast on a PET or glass substrate which had been pre-coated with a 200 μm layer of a transparent-conductive-oxide electrode (TCO-substrate). A doctor blade was used to cast the emulsion onto the electrode on the PET-substrate, 10 to 200 μm thick.

The film was dried at room temperature or 50° to 90° C., resulting in phase separation and polymer solidification. After complete drying, the film was 50 μm thick and had droplets and/or interconnected structure of the suspension dispersed in a polymeric matrix. A finished cell was obtained by laminating to a second TCO-substrate.

EXAMPLE 2

Example 1 was followed, except that the amount of the liquid polarizing suspension was increased to 6 to 10 grams. In this film with increased suspension content, the film had and interconnected structure of the suspension in the polymeric matrix.

EXAMPLES 3–5

Example 1 was followed, with light-polarizing particles dihydrocinchonidine sulfate, pyrazine-2,5-dicarboxylic acid polycalcium iodide and herapathite. These particles have high electrical conductivity and resistance to UV-light. Their size does not exceed 1 μm, and they have the shape of needles, laths, rods, or plates.

EXAMPLES 6–8

Example 1 was followed, with respective polymeric dispersants poly(neopentyl methacrylate-block-hydroxyethyl methacrylate), poly(acrylonitrile-block-styrene), and poly(neopentyl methacrylate-block-styrene).

EXAMPLE 9

Example 1 was followed, with poly(methyl methacrylate) as polymeric matrix material and with dioctyl isophthalate plasticizer as the suspending medium.

EXAMPLES 10–12

Example 9 was followed, with phthalic acid derivatives such as dicapryl phthalate, butyl octyl phthalate, and diisodecyl phthalate as liquid suspending media.

EXAMPLES 13–16

Example 9 was followed, with methyl methacrylate, toluene, xylene, and isoamyl acetate as solvents for the polymeric matrix.

EXAMPLE 17

Example 1 was followed, with poly(vinyl butyral) as polymeric matrix material and trioctyl trimellitate as the liquid suspending medium.

EXAMPLES 18–21

Example 17 was followed with dioctyl phthalate, butyl octyl phthalate, dioctyl adipate and methyl oleate as liquid suspending media.

EXAMPLES 22–24

Example 17 was followed, with methyl benzoate, toluene and xylene as solvents for the polymeric matrix material.

EXAMPLE 25

Example 1 was followed, with poly(vinyl acetate) as polymeric matrix material and dioctyl adipate as liquid suspending medium.

EXAMPLE 26 and 27

Example 25 was followed, with dioctyl phthalate and dioctyl isophthalate as liquid suspending media.

EXAMPLE 28 and 29

Example 25 was followed, with toluene and xylene as respective polymeric matrix materials.

EXAMPLE 30

An amount of 10 to 50 grams plasticizer compatible with the polymeric matrix was added to 100 grams of polymeric matrix material, and a homogeneous melt was formed at 80° C. The solution was mixed with the liquid polarizing suspension of Example 1. The mixture was cast on a PET or glass substrate which had been pre-coated with a TCO-layer and cooled at a rate of 5° to 10° C. per minute. The resulting film had liquid polarizing suspension droplets and/or interconnected structure of suspension in a polymeric matrix. A finished cell was made by lamination to a second TCO-substrate.

EXAMPLE 31

Example 30 was repeated, with the content of liquid polarizing suspension increased to 51 to 100 grams in the mixture of example 1 above. As a result of the increase, an interconnected structure of the suspension dispersed in the polymeric matrix was obtained.

EXAMPLE 32

Example 30 was followed, with poly(vinyl butyral) as polymeric matrix material, diisobutyl phthalate as compatible plasticizer, and butyloctyl phthalate as suspending medium.

EXAMPLES 33 and 34

Example 32 was followed, with dioctyl phthalate and diisooctyl phthalate as liquid suspending media.

TABLE 1

Properties and Polymer Compatibility of Plasticizers Used in the Present Invention.

|  | Mol. Weight | Density (g/cm³) | refractive Index | bp (°C.) | Tm (°C.) | PMMA | PVB | PVAc | CA | CAB | CN | EC |
|---|---|---|---|---|---|---|---|---|---|---|---|---|
| Dioctyl phthalate | 390 | 0.983 (25° C.) | 1.485 (25° C.) | 231 (5 mm) | −46 | C | P | I | I | C | C | C |
| Butyl octyl pthalate | 334 | 0.993 (25° C.) | 1.485 (25° C.) | 340 (740 mm) | <−50 | P | P | I | I | P | C | C |
| Diisooctyl phthalate | 390 | 0.985 (23° C.) | 1.485 (23° C.) | 228–239 (5 mm) | −50 | C | P | C | I | C | C | C |
| Dioctyl isophthalate | 391 | 0.984 (20° C.) | 1.4375 (20° C.) | 241 (5mm) | −46 | P | C | I | I | C | C | C |
| Methyl oleate | 296 | 0.875 (25° C.) | 1.4505 (25° C.) | 167–170 (2 mm) | −16 | P | P | P | I | P | C | C |
| Methyl ricinoleate | 310 | 0.925 (25° C.) | 1.4620 (25° C.) | 170 (1 mm) | −30 | P | C | C | P | C | C | C |
| Diisooctyl azelate | 413 | 0.92 (25° C.) | 1.450 (25° C.) | 225–244 (4 mm) | −68 | — | I | P | C | C | C | C |
| Diethylene glycol dibenzoate | 314 | 1.178 (25° C.) | 1.5424 (25° C.) | 230–242 (5 mm) | 16, 28 | C | C | C | P | C | C | C |
| Epoxidized soybean oil | 1000 | 1.02 (25° C.) | 1.4720 (25° C.) |  | −4 | I | I | I | I | P | C | C |
| Dioctyl adipate | 371 | 0.927 (20° C.) | 1.446 | 214 (5 mm) | −70 | P | P | P | P | C | C | C |
| Trioctyl trimellitate | 547 | 0.989 (20° C.) | 1.4832 (23° C.) | 260 (1 mm) | −38 | C | P | — | — | C | C | C |

C: compatible
P: partially compatible
I: incompatible

TABLE 2

Properties and Solvents of the Polymeric Matrix.

| Properties Polymer | refractive Index | Tm (°C.) | Density (g/cm³) | Solvents |
|---|---|---|---|---|
| PMMA | 1.490 (20° C.) | 180 | 1.19 | benzene, toluene, xylene, chloroform, isobutanol, dioxane, MEK, cyclohexanone acetic acid, formic acid, ethyl acetate, isoamyl acetate, nitroethane etc. |
| PVB | 1.485 | 51 (Tg) | 1.08 | acetone, methybenzoate, isopropanol, MEK, THF, methylene chloride etc. |
| PVAc | 1.466 | 30 (Tg) | 1.1 | benzene, toluene, chloroform, carbon tetrachloride methanol, ethanol, benzyl alcohol, THF, xylene, acetone, acetic acid, isoamyl acetate, benzyl acetate, DMF, DMSO etc. |
| Cellulose acetate | 1.475 (20° C.) | 240 | 1.31 | water, methyl acetate methanol, acetic acid, phenols, benzyl alcohol, dioxane, pyridine, aniline acetone, cyclohexanone, formic acid, acetic acid, methyl acetate, ethyl acetate etc. |

We claim:

1. A method for making a liquid-suspension type light-valve film, comprising:
   forming a suspension comprising light-polarizing particles and a dispersant/stabilizer in a liquid suspending medium;
   forming a matrix solution comprising a matrix material which, under light-valve operating conditions, is substantially incompatible with the liquid suspending medium;
   forming a homogeneous mixture/solution of the matrix solution and the suspension;
   coating the homogeneous mixture/solution onto a substrate; and
   whereby the light-valve film is formed by phase separation.

2. The method of claim 1, wherein phase separation comprises solvent evaporation.

3. The method of claim 2, wherein the matrix solution comprises a polymer resin dissolved in a solvent.

4. The method of claim 3, wherein the polymer resin is selected from the group consisting of poly(methyl methacrylate) and poly(vinyl butyral), and wherein the suspending medium is selected from the group consisting of phthalates isophthalates and oleates.

5. The method of claim 4, wherein the phthalate is selected from the group consisting of diisooctyl phthalate, dioctyl phthalate and butyloctyl phthalate, wherein the isophthalate is dioctyl isophthalate, and wherein the oleate is methyl oleate.

6. The method of claim 5, wherein the polymer resin is poly(methyl methacrylate) and wherein the solvent is selected from the group consisting of nonpolar aromatic hydrocarbons and esters.

7. The method of claim 6, wherein the nonpolar aromatic hydrocarbon is selected from the group consisting of xylene and toluene and wherein the ester is selected from the group consisting of isoamyl acetate and ethyl acetate.

8. The method of claim 6, wherein the polymer resin is poly(vinyl butyral) and wherein the solvent is selected from the group consisting of methyl benzoate, toluene and xylene.

9. The method of claim 1, wherein phase separation comprises polymerization.

10. The method of claim 1, wherein phase separation comprises thermal processing.

11. The method of claim 1, wherein the light-polarizing particles are sized from 0.1 to 1 μm.

12. The method of claim 1, wherein the liquid suspending medium and the matrix material have refractive indices which are substantially the same.

13. The method of claim 1, wherein the dispersant/stabilizer is a copolymer comprising a solvating component and an anchoring component.

14. The method of claim 13, wherein the copolymer is selected from the group consisting of A-B type block copolymer and graft copolymer.

15. The method of claim 14, wherein the A-B type block copolymer is selected from the group consisting of poly(acrylonitrile-block-styrene) and poly(neopentyl methacrylate-block-hydroxyethylmethacrylate).

16. The method of claim 1, wherein the suspension comprises light-polarizing particles substantially uniformly dispersed in the liquid suspending medium.

17. The method of claim 1, wherein the matrix material is a polymer resin.

18. The method of claim 17, wherein the polymer resin is poly(vinyl acetate) and wherein the suspending medium is a phthalate.

19. The method of claim 18, wherein the phthalate is selected from the group consisting of butyloctyl phthalate and dioctyl phthalate.

20. The method of claim 19, wherein the solvent is selected from the group consisting of toluene and xylene.

21. The method of claim 17, wherein the polymer resin is cellulose acetate and wherein the suspending medium is a benzoate.

22. The method of claim 21, wherein the benzoate is diethylene glycol dibenzoate.

23. The method of claim 22, wherein the solvent is methyl acetate.

24. The method of claim 17, wherein the polymer resin is solidified by evaporating the solvent.

25. The method of claim 1, wherein the matrix material is selected from the group consisting of monomers and prepolymers.

26. The method of claim 25, wherein the monomer is selected from the group consisting of methyl methacrylate, hydroxy-terminated poly(methyl methacrylate), and carboxy-terminated poly(methyl methacrylate) and wherein the suspending medium is selected from the group consisting of phthalates, isophthalates and oleates.

27. The method of claim 26, wherein the phthalate is selected from the group consisting of diisooctyl phthalate, dioctyl phthalate and butyloctyl phthalate, wherein the isophthalate is dioctyl isophthalate, and wherein the oleate is methyl oleate.

28. The method of claim 25, wherein the monomer is vinyl acetate and wherein the suspending medium is a phthalate.

29. The method of claim 28, wherein the phthalate is selected from the group consisting of butyloctyl phthalate and dioctyl phthalate.

30. The method of claim 25, wherein the monomer or prepolymer is solidified by polymerization.

31. The method of claim 1, wherein the matrix material is a thermoplastic polymer.

32. The method of claim 31, wherein the thermoplastic polymer is poly(vinyl butyral) and wherein the suspending medium is a phthalate.

33. The method of claim 32, wherein the phthalate is selected from the group consisting of diisobutyl phthalate, dioctyl phthalate and butyloctyl phthalate.

34. The method of claim 31, wherein the thermoplastic polymer is ethylene vinyl acetate copolymer and wherein the suspending medium is a phthalate.

35. The method of claim 34, wherein the phthalate is selected from the group consisting of diisobutyl phthalate, dioctyl phthalate and butyloctyl phthalate.

36. The method of claim 31, further comprising heat-fluidizing the thermoplastic polymer prior to forming the mixture/solution, and wherein phase separation comprises cooling to solidify.

* * * * *